UNITED STATES PATENT OFFICE 2,606,193

PYRIDYL CARBINOL ETHERS AND PROCESS OF PREPARING SAME

John W. Cusic, Skokie, Ill., assignor, by mesne assignments, to The Wm. S. Merrell Company, Cincinnati, Ohio, a corporation of Delaware No Drawing. Application July 10, 1946,
Serial No. 682,583

6 Claims. (Cl. 260—296)

This invention relates to a group of substituted aminoalkyl ethers of certain pyridyl aromatic carbinols, all of which are represented by the formula

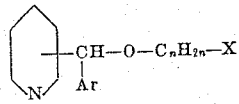

in which Ar represents a phenyl, or an alkyl or alkoxy-substituted phenyl group, in which $n$ stands for 2 or 3 (the chain being either straight or branched), and in which X represents a monoalkylamino, a dialkylamino, a N-piperidino, or a N-morpholino group. These basic ethers generally are oils which are soluble in the common organic solvents and nearly insoluble in water and which in certain instances can be distilled without decomposition in a good vacuum. They behave as di-acid bases, readily forming salts with two equivalents of organic or inorganic acids, which salts are readily soluble in water, though they are frequently difficult to crystallize because of their hygroscopic nature and extreme solubility. While the useful therapeutic properties of these compounds are common to both the free basic ethers and the salts thereof, the salts generally constitute a more convenient form in which to use these ethers because of their water solubility, and it is to be understood that the appended claims include these ethers in the form of both the free base and the salts thereof.

Most of the ethers of this invention may be readily prepared by the action of solid sodium hydroxide on a mixture of a pyridyl aromatic carbinol and a substituted aminoalkyl halide salt. The pyridyl aromatic carbinols in turn may be prepared either by the interaction of a pyridyl magnesium halide upon an aromatic aldehyde or by the careful reduction of the corresponding pyridyl aromatic ketone. The substituted aminoalkyl halides are well known in the prior art, being readily prepared from the corresponding aminoalcohols by the action of such agents as thionyl chloride. The following example will illustrate in detail how the compounds of this invention may be prepared by this method, though it is not to be construed as limiting this invention in any manner, save as described in the appended claims.

*Example 1*

A mixture of 37 grams of phenyl 2-pyridyl carbinol, 54 gm. of β-diethylaminoethyl chloride hydrochloride, and 32 gm. of powdered sodium hydroxide is heated upon a steam bath for about eight hours during constant agitation. After cooling, water is added and the bases extracted with ether. The ether solution is washed with water, dried over solid sodium hydroxide, and after removal of the solvent, a residue of crude β-diethylaminoethyl ether of phenyl 2-pyridyl carbinol is left. This may be further purified by distillation, boiling at 174–176° centigrade at 2 millimetres pressure.

When an ethereal solution of the base is treated with alcoholic hydrogen chloride, a semi-solid mass is precipitated which is resistant to crystallization. Consumption of acid shows it to be the dihydrochloride. For use, the material is best dissolved in water in which it is readily soluble. The dimethylaminoethyl ether of the same carbinol (free base, boiling point 165–170° C. at 1 mm. pressure) forms a dihydrochloride of similar appearance.

By using equivalent quantities of other carbinols (such as the 3- or 4-pyridyl isomers of the one in Example 1, or 2,4-dimethylphenyl 2-pyridyl carbinol, p-methoxyphenyl 4-pyridyl carbinol, 2,4-dimethoxyphenyl 2-pyridyl carbinol, or other alkyl or alkoxy substituted phenyl pyridyl carbinols) in place of the phenyl 2-pyridyl carbinol in Example 1, the corresponding amino ether may be readily obtained. Likewise, the replacement of the diethylaminoethyl chloride hydrochloride specified in Example 1 by such compounds as the hydrochlorides of dimethylaminoethyl chloride, dibutylaminopropyl chloride, diethylaminopropyl chloride, piperidinopropyl chloride, morpholinoethyl chloride or piperidinoethyl chloride results in the formation of the corresponding aminoalkyl ether of the carbinol chosen. Thus, it will be seen that the reaction illustrated in the example is of general application to the compounds of this invention.

The method of preparation illustrated in Example 1 is relatively unsatisfactory for the preparation of certain of the compounds contemplated in this invention, particularly the monoalkylamino ethers of the pyridyl aromatic carbinols. These are best prepared through the interaction of a halogenalkyl ether of the desired carbinol with a monoalkyl amine as illustrated in Example 2.

*Example 2*

Phenyl 3-pyridyl carbinol is gently warmed with approximately its own weight of phosphorus pentachloride to form phenyl 3-pyridyl methyl chloride. Fifty grams of this chloride are heated with 25 gm. of anhydrous sodium carbonate and 35 gm. of ethylene bromohydrin at 120° to 130° C. for about eight hours, during constant stirring. After cooling, the reaction mixture is diluted with about two volumes of benzene, and the insoluble inorganic material separated by filtration. Removal of the solvent leaves the crude β-bromoethyl ether of phenyl 3-pyridyl carbinol as an oil which is readily purified by vacuum distillation.

This bromoether is readily converted to the monoalkylamino ethers of this invention by heating with about 3 molecular equivalents of a monoalkyl amine in anhydrous ethanol solution. Thus, using monomethylamine, the monomethylaminoethyl ether of phenyl 3-pyridyl carbinol is obtained, while monoethyl, monoisopropyl, or monobutyl amines yield, respectively, the corresponding ethyl, isopropyl and butylamino ethyl ethers.

The method of preparation illustrated in Example 2 is of general utility in preparing the other amino ethers of this invention as an alternate method to Example 1. Thus, other pyridyl aromatic carbinols may be used to form the corresponding pyridyl aromatic methyl chloride; propylene bromohydrin or trimethylene bromohydrin may be used in place of ethylene bromohydrin to yield aminopropyl ethers, and dialkylamines, piperidine, or morpholine may be used in place of the monoalkylamines. The proper combination of such starting materials will lead to the formation of any of the aminoalkyl ethers of pyridyl aromatic carbinols contemplated within this invention.

These compounds have been found to be useful as therapeutic agents, particularly as antispasmodic, antihistamine, or anti-allergic agents. By way of illustration of the latter utility, when a solution of the hydrochloride of β-dimethylaminoethyl ether of phenyl 2-pyridyl carbinol (which compound constitutes a preferred embodiment of this invention) is injected into guinea pigs previously sensitized to a protein (such as horse serum), it is found that animals thus injected with the new compound are in most instances protected from death by anaphylactic shock under conditions uniformly fatal to uninjected control animals. The anti-histamine utility of the compounds of this invention has been demonstrated by injecting therapeutic doses of representative compounds into guinea pigs and exposing these pigs to an atmosphere filled with a spray of histamine solution of such concentration that it is known to kill untreated guinea pigs in a relatively few minutes. Animals thus treated with a compound of this invention prior to exposure are protected from death in a high percentage of cases, and in some instances exhibit only the mildest symptoms of histamine intoxication. Antispasmodic utility has been demonstrated by the ability of compounds of this invention to relax spasms produced in smooth muscle strips by such agents as acetylcholine or barium ions. As will be expected, these compounds vary among themselves not only in potency as measured by these tests, but also in toxicity. The toxic doses are sufficiently high, however, that it is readily possible safely to administer therapeutically effective doses as described above.

The invention is not limited except as defined by the appended claims.

I claim:

1. Aminoalkyl ethers of pyridyl carbinols of the formula

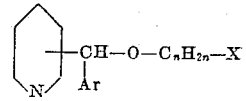

in which Ar is chosen from the class consisting of phenyl, and alkyl- and alkoxy-substituted phenyl, groups; in which $n$ represents an integer between 1 and 4; and in which X is chosen from the class consisting of monoalkylamino, dialkylamino, N-piperidino and N-morpholino groups.

2. The dimethylaminoethyl ether of phenyl 2-pyridyl carbinol, whose formula is

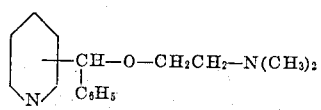

3. The dimethylaminoethyl ether of phenyl 3-pyridyl carbinol, whose formula is

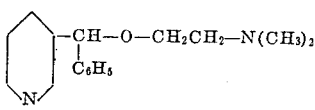

4. The process of producing an aminoalkyl ether of an aryl-pyridyl-carbinol which comprises reacting an aryl-pyridyl-carbinol and an aminoalkyl halide salt in the presence of alkali and separating the aminoalkyl ether of the aryl-pyridyl-carbinol.

5. The process of producing an aminoalkyl ether of phenyl-pyridyl-carbinol which comprises reacting phenyl-pyridyl-carbinol with an aminoalkyl halide salt in the presence of alkali and separating the aminoalkyl ether of phenyl-pyridyl-carbinol.

6. The process of producing the beta-dimethylaminoethyl ether of phenyl-2-pyridyl-carbinol which comprises reacting phenyl-2-pyridyl-carbinol with beta-dimethylaminoethyl chloride hydrochloride in the presence of powdered sodium hydroxide, adding water to dissolve inorganic material, and separating the beta-dimethylaminoethyl ether of phenyl-2-pyridyl-carbinol.

JOHN W. CUSIC.

REFERENCES CITED

The following references are of record in the file of this patent:

UNITED STATES PATENTS

| Number | Name | Date |
|---|---|---|
| 2,397,799 | Martin et al. | April 2, 1946 |
| 2,421,714 | Riederschl, Jr. | June 3, 1947 |

OTHER REFERENCES

Jour. Chem. Soc., pp. 809–812 (1939).

Journal of Pharmacology, vol. 83 pp. 120–128 (1945).

Hartman: California Medicine 66 No. 4, pp. 242–248 (1947).

Sidgwick's Organic Chemistry of Nitrogen, New Addition (Oxford and Clarendon Press) page 522.